United States Patent Office 2,727,031
Patented Dec. 13, 1955

2,727,031

METALLIFEROUS PYRAZOLONE AZO-DYESTUFFS

Christian Zickendraht, Binningen, and Arthur Buehler, Rheinfelden, Switzerland, assignors to Ciba Limited, Basel, Switzerland No Drawing. Application July 22, 1952,
Serial No. 300,334

Claims priority, application Switzerland August 7, 1951

19 Claims. (Cl. 260—147)

According to this invention valuable new metalliferous azo-dyestuffs are made by treating a monoazo-dyestuff free from sulfonic acid and carboxylic acid groups and corresponding to the general formula (1)

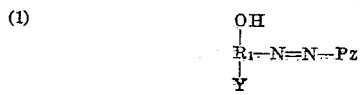

in which $R_1$ represents a benzene radical bound to the azo linkage in ortho-position relatively to the hydroxyl group, Pz represents a 5-pyrazolone radical bound in the 4-position to the azo linkage, and Y represents a substituted sulfonic acid amide group, with an agent yielding cobalt or chromium in such manner that the resulting metalliferous dyestuff contains less than one atom of cobalt or chromium in complex union per molecule of monoazo-dyestuff.

The monoazo-dyestuffs used as starting materials and corresponding to the above general formula, can be made by coupling an ortho-hydroxy-diazo-compound of the benzene series, which is free from sulfonic acid and carboxylic acid groups and contains a substituted sulfonic acid amide group, with a 5-pyrazolone which is also free from sulfonic acid and carboxylic acid groups.

As ortho-hydroxy-diazo-compounds of the benzene series, which contain a substituted sulfonic acid amide group, there come into consideration for making the dyestuffs serving as starting materials for the present process diazo compounds of ortho-hydroxy-amines of the formula

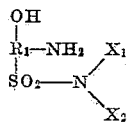

in which $R_1$ represents a benzene radical which contains the hydroxyl group and amino group in ortho-position relatively to one another, $X_1$ represents an aliphatic, araliphatic or aromatic radical, and $X_2$ represents a hydrogen atom or an aliphatic radical or constitutes together with $X_1$ and —N— a heterocyclic radical. In addition to the sulfonic acid amide, hydroxyl and amino groups the benzene radical $R_1$ of such an ortho-hydroxy-amine may contain further substituents, such as halogen atoms (for example, chlorine), alkyl groups (for example, methyl), alkoxy groups (for example, methoxy), nitro groups, —CO— alkyl groups, (for example, —CO—CH₃), and acylamino groups (for example, acetylamino). Especially valuable are 4-methoxy-2-amino-1-hydroxybenzene-5-sulfonic acid-N-methyl- or -N-diethylamide, 6-nitro - 2 - amino - 1- hydroxybenzene - 4 - sulfonic acid-N-methylamide, 4-nitro-2-amino-1-hydroxybenzene-6-sulfonic acid-N-methyl- or -N-phenyl-amide, 4-chloro-2-amino-1-hydroxybenzene-5-sulfonic acid-N-methylamide, 4-chloro-2-amino-1-hydroxybenzene-6-sulfonic acid - N-methyl-amide and especially 2-amino-1-hydroxybenzene-4-sulfonic acid-N-methyl-, -N-ethyl-, -N-isopropyl-, -N-n-butyl-, -N-β-hydroxyethyl-, -N-β-methoxyethyl-, -N-β-chlorethyl-, -N-octyl-, -N-cyclo-hexyl-, -N-phenyl-, -N-dimethyl-, -N-diethyl-, -N-ethylphenyl-, -N-methylphenyl-amide and the corresponding 2-amino-1-hydroxybenzene-5-sulfonic acid amides, and also 2-amino-1-hydroxy-benzene-4- or -5-sulfonic acid-N-benzylamide and 2-amino-1-hydroxybenzene-4- or -5-sulfonic acid pyrrolidide.

As 5-pyrazolones there may be used those which are substituted or unsubstituted in the 1- and/or 3-positions. As examples there may be mentioned:
5-pyrazolone itself, 1-aryl-5-pyrazolones, 3-methyl-5-pyrazolone, 1-alkyl-3-methyl-5-pyrazolones such as 1-methyl-, 1-n-propyl-, 1-isopropyl-, 1-n-butyl-, 1-n-hexyl- or 1-n-octyl-3-methyl-5-pyrazolone, and also 1-cyclohexyl- or 1-aryl-3-methyl-5-pyrazolones such as 1-α-naphthyl-3-methyl-5-pyrazolone, and more especially 1-phenyl-3-methyl-5-pyrazolones, such as 1-phenyl-3-methyl-5-pyrazolone itself, 1-(2'- or 3'- or 4'-chlorophenyl)-3-methyl-5-pyrazolone, 1-phenyl-3-methyl-5-pyrazolone-3'- or 4'-sulfonic acid amide, 1-(2'- or 3'- or 4'-methylphenyl)-3-methyl-5-pyrazolone, 1-(3'- or 4'-nitrophenyl)-3-methyl-5-pyrazolone, 1-(4'-tertiary amyl-phenyl)-3-methyl-5-pyrazolone, 1-(3'-trifluoromethylphenyl)-3-methyl-5-pyrazolone, 1-(2':5'-dichlorophenyl)-3-methyl-5-pyrazolone, 1-(2' - trifluoromethyl - 4' - chlorophenyl) - 3 - methyl - 5-pyrazolone, 1 - (3' - trifluoromethyl - 6' - chlorophenyl)-3 - methyl - 5 - pyrazolone, 1 - (2':5' - dibromophenyl)-3-methyl-5-pyrazolone, 1-(2'- or 4'-fluorophenyl-3-methyl-5-pyrazolone, 1-(2'-methyl-4'-chlorophenyl)-3-methyl-5-pyrazolone and also 5-pyrazolone-3-carboxylic acid amides, which may be free from or contain a substituent in the 1-position, such as 5-pyrazolone-3-carboxylic acid anilide, 5-pyrazolone-3-carboxylic acid para-chloranilide, 5-pyrazolone-3-carboxylic acid methyl-, -ethyl-, isopropyl-, -n-butyl- or cyclohexyl-amide, 5-pyrazolone-3-carboxylic acid-N-dimethyl- or -diethyl-amide, 1-phenyl-5-pyrazolone-3-carboxylic acid amide or the corresponding methyl-, -ethyl-, -isopropyl-, -n-butyl- or -dimethyl- amide and 1-(4'-chloro)-phenyl-5-pyrazolone-3-carboxylic acid amide.

The ortho-hydroxydiazo-compounds may be coupled with the pyrazolones by the customary known methods, for example, in a weakly acid to alkaline medium.

The monoazo-dyestuffs used as starting materials in the present process may also be made by the process of United States Patent No. 2,512,251 by coupling one of the above mentioned ortho-hydroxy-diazo-compounds with an aryl-hydrazone of formylacetic acid ester. (In that process ring closure to form the 1-aryl-5-pyrazolone takes place simultaneously with the coupling.)

After the coupling reaction and for the purpose of metallization the dyestuff can be easily separated from the reaction mixture by filtration, if required with the addition of sodium chloride, since the dyestuffs are only slightly soluble in water. They are advantageously subjected to metallization in the form of filter cakes without any intermediate drying. In some cases it is possible to carry out the metallization directly in the coupling mixture without any intermediate separation.

The monoazo-dyestuffs serving as starting materials and obtainable as described above are in part new. In general they are not especially soluble in water even in the form of their alkali compounds. However, some of them are of such good solubility in this form that they can be used for dyeing wool from dyebaths which require no addition of acid, for example, by the single bath chroming process.

The treatment with an agent yielding chromium or cobalt in the present process is carried out in such manner that a metalliferous dyestuff is obtained which contains less than one atom of cobalt or chromium in complex union per molecule of monoazo-dyestuff. Accordingly, the metallization is advantageously carried out with such agents yielding cobalt or chromium and by such methods as yield complex metal compounds of the aforesaid constitution. In general it is of advantage to use a quantity of the agent yielding cobalt or chromium containing less than one atom of cobalt or chromium for each molecule of monoazo-dyestuff and/or to carry out the metallization in a weakly acid to alkaline medium. Consequently, there are especially suitable those agents yielding cobalt or chromium which are stable to alkaline media such, for example, as complex cobalt or chromium compounds of aliphatic dicarboxylic or hydroxy-carboxylic acids or advantageously chromium compounds of aromatic ortho-hydroxy-carboxylic acids, which contain the chromium in complex union. As examples of aliphatic dicarboxylic and hydroxy-carboxylic acids there may be mentioned, inter alia, oxalic acid, lactic acid, glycollic acid, citric acid and especially tartaric acid, and among the aromatic ortho-hydroxycarboxylic acids, for example, those of the benzene series such as 4-, 5- or 6-methyl-1-hydroxybenzene-2-carboxylic acid and above all 1-hydroxybenzene-2-carboxylic acid itself. As agents yielding cobalt there are advantageously used simple compounds of divalent cobalt such as cobalt sulfate or cobalt acetate, and, if desired, cobalt hydroxide.

The conversion of the dyestuffs into complex cobalt or chromium compounds is advantageously carried out at a raised temperature, and under atmospheric or superatmospheric pressure, for example at the boiling temperature of the reaction mixture, if desired in the presence of suitable additions, for example, in the presence of salts of organic acids, bases, organic solvents or other agents assisting the formation of complexes.

In one form of the process a mixture of two different metallizable monoazo-dyestuffs is used as starting material, both of which correspond to the general formula given above or one of which corresponds to that general formula and the other is an ortho:ortho'-dihydroxy-monoazo-dyestuff of the benzene-azo-naphthalene series free from sulfonic acid and carboxylic acid groups, and advantageously one of the formula (2) 

in which $R_2$ represents a benzene radical, advantageously a benzene radical containing a sulfonic acid amide group, which is bound to the azo-linkage in ortho-position relatively to the hydroxyl group, and $R_3$ represents a naphthalene radical which is bound to the hydroxyl group in the 1- or advantageously 2-position and to the azo linkage in the other of those positions.

The ortho:ortho'-dihydroxy-monoazo-dyestuffs of the benzene-azo-naphthalene series which come into consideration in the form of the process last described above, can be made by coupling an ortho-hydroxy-diazo compound of the benzene series with an hydroxy-naphthalene capable of coupling in a position vicinal to the hydroxyl group. As examples of such ortho-hydroxy-diazo-compounds of the benzene series there may be mentioned those obtainable from the following amines: 6-acetylamino-4-nitro-2-amino-1-hydroxybenzene, 4-nitro- or 5-nitro-2-amino-1-hydroxybenzene, 4:6-dinitro- or 4:6-dichloro-2-amino-1-hydroxybenzene, 4-nitro-6-chloro-2-amino-1-hydroxybenzene, 6-nitro-4-acetyl-amino-2-amino-1-hydroxybenzene, 2-amino-1-hydroxybenzene-4-methyl sulfone and the 2-amino-1-hydroxybenzene sulfonic acid amides mentioned above. As hydroxynaphthalenes there come into consideration α-naphthols such, for example, as 5-chloro-1-hydroxynaphthalene, 5:8-dichloro-1-hydroxynaphthalene and above all β-naphthols such, for example, as 2-hydroxynaphthalene, 6-methoxy- or 6-bromo-2-hydroxynaphthalene, 1-acetylamino, 1-n-butyrylamino- or 1-benzoylamino-7-hydroxynaphthalene.

In this form of the process the treatment with the agent yielding metal must of course be carried out so that the resulting metalliferous dyestuffs contain less than one atom of metal in complex union per molecule of monoazo-dyestuff.

In a further form of the process a mixture of agents yielding metal, for example, a mixture of an agent yielding cobalt and an agent yielding chromium is used.

The chromiferous dyestuffs of the invention can also be made by a process, indeed somewhat more complicated, in which a chromium compound of a monoazodyestuff containing one atom of chromium bound in complex union per molecule of dyestuff (a 1:1-complex) is reacted with a metal-free monoazo-dyestuff, and the starting materials are so chosen that the metal-free monoazo-dyestuff and the chromiferous monoazo-dyestuff (1:1-complex) are free from sulfonic acid and carboxylic acid groups, and that either both dyestuffs correspond to the general Formula 1 or one of them corresponds to that formula and the other is an ortho:ortho'-dihydroxy-monoazo-dyestuff of the benzene-azo-naphthalene series.

The starting materials in this form of the process may be so chosen that either the monoazo-dyestuff present in the complex chromium compound (the 1:1-complex) or the metal-free dyestuff or both such dyestuffs correspond to the general Formula 1.

The 1:1-complexes containing chromium and used as starting materials in this form of the process, can be made by the ordinary methods in themselves known for example, by reacting the monoazo-dyestuff free from metal bound in complex union in an acid medium with an excess of a salt of trivalent chromium, for example, chromium fluoride or chromium formate, at the boiling temperature or if desired at a temperature above 100° C. There may be used as starting materials ortho:ortho'-dihydroxy-monoazo-dyestuffs of the aforesaid constitutions or the corresponding ortho-alkoxy-ortho'-hydroxy-monoazo-dyestuffs. In the latter case the chroming is carried out under conditions such that the alkyl group is split off from the ortho-alkoxy-ortho'-hydroxy-azo-grouping.

The reaction of the 1:1-complex so obtained with the metal-free dyestuff is advantageously carried out in an aqueous neutral to alkaline medium at the ordinary or a raised temperature.

The products obtainable in accordance with the invention are new. They are cobalt or chromium compounds which contain two monoazo-dyestuffs in the form of a complex in which the ratio of the number of cobalt or chromium atoms in complex union to the number of monoazo-dyestuff molecules bound to cobalt or chromium in complex union is smaller than 1:1, and advantageously about 1:2, and in which complex the two dyestuffs are ortho:ortho'-dihydroxy-monoazo-dyestuffs free from sulfonic acid and carboxylic acid groups, and one of which dyestuffs corresponds to the general Formula 1, while the other is an ortho:ortho'-dihydroxy-monoazo-dyestuff of the benzene-azo-naphthalene series or also corresponds to the general Formula 1. Especially valuable are the cobalt and chromium compounds of this kind, which contain two monoazo-dyestuffs both of which correspond to the general Formula 1, and above all those which contain two monoazo-dyestuffs of the same constitution.

The new cobaltiferous and chromiferous dyestuffs are soluble in water and in a weakly acid aqueous medium, and are more soluble than the metal-free dyestuffs used in making them. They are suitable for dyeing or printing a very wide variety of materials, above all for dyeing animal materials such as silk, leather and especially wool, but also for dyeing or printing synthetic fibers of superpolyamides and superpolyurethanes. In contradistinction to the chromium compounds of dyestuffs containing sulfonic acid groups, with which it is of advantage to dye from a strongly acid bath, for example, a sulfuric acid bath, the new metal compounds of monoazo-dyestuffs free from sulfonic acid groups are especially suitable for dyeing from very weakly alkaline and neutral to weakly acid, advantageously acetic acid, baths. The dyeings so produced are distinguished by their level character, good fastness to carbonizing and decatizing, very good properties of wet fastness, for example, very good fastness to fulling and washing and also very good fastness to light.

The following examples illustrate the invention, the parts and percentages being by weight unless otherwise stated and the relationship of parts by weight to parts by volume being the same as that of the kilogram to the liter.

*Example 1*

20.2 parts of 2-amino-1-hydroxybenzene-5-sulfonic acid-N-methyl-amide are dissolved in 200 parts of water with the addition of 4 parts of sodium hydroxide. After the addition of 34 parts of hydrochloric acid of 30 per cent strength a solution of 6.9 parts of sodium nitrite in 25 parts of water is run in at 0–5° C. When the diazotization has finished, the diazo compound which is partially precipitated in a crystalline form is neutralized by the addition of sodium carbonate, and introduced into a cooled solution of 15.4 parts of 1-n-butyl-3-methyl-5-pyrazolone, 4 parts of sodium hydroxide, 13.6 parts of crystalline sodium acetate and 250 parts of water. When the coupling has finished, the dyestuff so formed is precipitated by the addition of sodium chloride and separated by filtration. When dry it is a brown powder which dissolves in water and in concentrated sulfuric acid with an orange coloration, and dyes wool from an acid bath yellow tints, which are converted by after-chroming into reddish orange tints of good fastness to fulling and light. The dyestuff is also suitable for dyeing by the single bath chroming process.

The resulting dyestuff is dissolved in 2000 parts of water. 125 parts of a solution of sodium chromosalicylate having a chromium content of 2.6 per cent. are added. After boiling for about 6 hours under reflux the chroming is complete. The chromium complex so formed is precipitated by the addition of sodium chloride, neutralized with acetic acid and then separated by filtration. When dry it is a red-orange powder which dissolves in water with an orange coloration and in concentrated sulfuric acid with a green-yellow coloration, and dyes wool from a neutral bath and also an acetic acid bath deep orange tints having good properties of wet fastness and a very good fastness to light.

The 1-n-butyl-3-methyl-5-pyrazolone used in this example, may, for example, be prepared as follows:

210 parts of sodium hydroxide of 98 per cent. purity are dissolved in 700 parts of ethyl alcohol, and at a temperature below 40° C., two portions of 168 parts of hydrazine sulfate of about 99 per cent. purity are added in succession while stirring. After 30 minutes there are added in the same manner alternately 100 parts of sodium hydroxide of 98 per cent. purity and 168 parts of hydrazine sulfate. The resulting easily stirrable mass is stirred overnight in the cold, and filtered with suction to remove the sodium sulfate formed. The filter residue is washed with 200 parts of ethyl alcohol, the filtrate is mixed with the ethyl alcohol washings and made up to 1000 parts by volume with alcohol.

The solution so obtained is boiled with 137 parts of n-butyl bromide (about 1 mol to 5 mols of hydrazine) while stirring well for 18 hours under reflux, and the mixture is then cooled. At 10–20° C. there are then slowly run in, while stirring well, 500 parts of sulfuric acid of 98 per cent. strength (5 mols) and the mixture is then stirred for one hour. The hydrazine sulfate which precipitates in a fine sandy form is separated by filtering with suction and washed with alcohol. By concentrating the filtrate the n-butyl-hydrazine sulfate is easily caused to crystallize and is then separated by filtration. There are obtained white needles melting at 140–141° C.

37.2 parts of n-butyl-hydrazine sulfate are stirred in 480 parts of water at 30–40° C., and 55 parts of crystalline sodium acetate and 5 parts of glacial acetic acid are added. 20.2 parts of acetoacetic acid amide (obtainable as described in Example 7 of United States Patent No. 2,152,132), are added, and the whole is stirred for a few hours at room temperature. The pyrazolone so formed slowly precipitates. It is separated by filtration, washed with water and dried in vacuo at 50° C.

*Example 2*

10.1 parts of 2-amino-1-hydroxybenzene-4-sulfonic acid-N-methylamide are diazotized as described in Example 1 and the resulting neutralized diazo compound is coupled at 5–10° C. with a solution of 8.9 parts of 1-phenyl-3-methyl-5-pyrazolone in 50 parts of water, 6.8 parts of sodium hydroxide solution of 30 per cent. strength and 12 parts of crystalline sodium acetate. The coupling proceeds very rapidly. The resulting dyestuff is completely precipitated by the addition of a small amount of sodium chloride, and the dyestuff is separated by filtration.

The dyestuff paste from the filtration is dissolved in 300 parts of water and 6.7 parts of sodium hydroxide solution of 30 per cent. strength, and after the addition of 60 parts of a solution of sodium chromosalicylate having a chromium content of 2.6 per cent. the whole is boiled for 3 hours under reflux. At the end of this period the chroming is complete. The dyestuff is precipitated by the addition of sodium chloride, filtered off and dried. It is a water-soluble red-brown powder which dissolves in concentrated sulfuric acid with an orange-yellow coloration and in sodium carbonate solution with an orange-red coloration, and dyes wool from a weakly alkaline, neutral or acetic acid bath orange tints of very good fastness to light and washing.

By dissolving the dyestuff paste obtained as described in the first paragraph of this example in 300 parts of water and 13 parts of sodium hydroxide solution of 30 per cent. strength, the corresponding cobalt compound of the dyestuff is obtained after the addition of 150 parts of cobalt sulfate solution having a cobalt content of 1.3 per cent. and heating the mixture for ½ hour at 80–85° C. The cobalt complex is precipitated by neutralization with dilute acetic acid, separated by filtration and dried. It is a yellow brown water-soluble powder which dissolves in concentrated sulfuric acid with a yellow coloration and in sodium carbonate solution with an orange yellow coloration, and dyes wool from a weakly alkaline, neutral or acetic acid bath brownish yellow tints of good fastness to washing and light.

In the same manner the dyestuff from diazotized 2-amino-1-hydroxybenzene-4-sulfonic acid-N-methyl-amide and 1-(4'-chlorophenyl)-3-methyl-5-pyrazolone may be converted into a chromium or cobalt compound, and the chromium compound dyes wool orange tints of good fastness to washing and light and the cobalt compound yields brownish yellow tints of similar fastness.

*Example 3*

26.4 parts of 2-amino-1-hydroxybenzene-4-sulfonic acid anilide are dissolved in 80 parts of 2 N-hydrochloric acid and diazotized at 0–5° C. with 6.9 parts of sodium nitrite. The sparingly soluble diazo-compound is separated by filtration and introduced into a solution of 18.3 parts of 1-phenyl-3-methyl-5-pyrazolone in 100 parts of water, 14 parts of sodium hydroxide solution of 30 per cent. strength and 3 parts of sodium carbonate at 0–5° C. When the coupling is finished, the dyestuff is separated by filtration.

The resulting dyestuff paste is converted in the manner described in the second paragraph of Example 2 into the chromium compound. The resulting complex is a water-soluble orange-red powder which dissolves in concentrated sulfuric acid with an orange-yellow coloration and in sodium carbonate solution with an orange-red coloration, and dyes wool from a weakly alkaline, neutral or acetic acid bath orange tints, of very good fastness to washing and light.

The cobalt compound of the above dyestuff, prepared in the manner described in the third paragraph of Example 2, is a water-soluble brown powder which dissolves in concentrated sulfuric acid with an orange yellow coloration and in sodium carbonate solution with an orange-brown coloration, and dyes wool from a neutral or acetic acid bath brownish yellow tints which are fast to washing and light.

In the following table are given further examples of complex metal compounds prepared by the method described above. In column I are given the diazo components used, in column II the coupling components, and in column III the metals. In column IV are given the tints of the dyeings obtainable in dyeing wool from a neutral or acetic acid bath with the complex metal compounds.

| | I Diazo-components | II Coupling components | III Metal | IV Dyeing on wool |
|---|---|---|---|---|
| 1 | 2-amino-1-hydroxybenzene-5-sulfonic acid methylamide. | 1-n-butyl-3-methyl-5-pyrazolone. | Co | brownish-orange. |
| 2 | ___do___ | 1-phenyl-3methyl-5-pyrazolone. | Cr | red. |
| 3 | 2-amino-1-hydroxybenzene-5-sulfonic acid dimethylamide. | ___do___ | Cr | orange. |
| 4 | ___do___ | ___do___ | Co | brown-yellow. |
| 5 | ___do___ | 1-(4'-chlorophenyl)-3-methyl-5-pyrazolone. | Cr | orange. |
| 6 | ___do___ | ___do___ | Co | brown yellow. |
| 7 | 2-amino-1-hydroxybenzene-4-sulfonic acid iso-propylamide. | 1-phenyl-3-methyl-5-pyrazolone. | Cr | orange. |
| 8 | ___do___ | ___do___ | Co | brown yellow. |
| 9 | 2-amino-1-hydroxybenzene-4-sulfonic acid dimethylamide. | 5-pyrazolone-3-carboxylic acid anilide. | Cr | bluish red. |
| 10 | 2-amino-1-hydroxybenzene-4-sulfonic acid methylamide. | 5-pyrazolone-3-carboxylic acid - N - 2' - methyl - 4' - chlorphenylamide. | Cr | Do. |
| 11 | ___do___ | 5-pyrazolone-3-carboxylic acid anilide. | Cr | Do. |
| 12 | 2-amino-1-hydroxybenzene-4-sulfonic acid - n - butyl amide. | 5-pyrazolone-3-carboxylic acid - n - butylamide. | Cr | Do. |
| 13 | 2-amino-1-hydroxybenzene-4-sulfonic acid anilide. | 1-(4'-chlorophenyl)-pyrazolone-3-carboxylic acid amide. | Cr | Do. |
| 14 | ___do___ | 3-methyl-5-pyrazolone. | Cr | orange. |
| 15 | ___do___ | ___do___ | Co | brown yellow. |
| 16 | 2-amino-1-hydroxybenzene-4-sulfonic acid - 4' - chloranilide. | ___do___ | Co | Do. |
| 17 | 2-amino-1-hydroxybenzene-4-sulfonic acid - N - methylanilide. | 1-phenyl-3-methyl-5-pyrazolone. | Cr | orange. |
| 18 | ___do___ | ___do___ | Co | brown yellow. |
| 19 | 2-amino-1-hydroxybenzene-4-sulfonic acid-N-cyclohexylamide. | ___do___ | Cr | orange. |
| 20 | ___do___ | ___do___ | Co | brown yellow. |
| 21 | 2-amino-1-hydroxybenzene-4-sulfonic acid - N - benzyl - amide. | ___do___ | Cr | orange. |
| 22 | ___do___ | ___do___ | Co | brown yellow. |
| 23 | 4-nitro-2-amino-1-hydroxybenzene-6-sulfonic acid anilide. | 3-methyl-5-pyrazolone. | Cr | yellowish orange. |
| 24 | ___do___ | ___do___ | Co | yellow brown. |
| 25 | 4-nitro-2-amino-1-hydroxybenzene-6-sulfonic acid-N-methylamide. | 1-phenyl-3-methyl-5-pyrazolone. | Cr | yellowish orange. |
| 26 | 2-amino-1-hydroxybenzene-4-sulfonic acid methylamide. | 1-(4'-fluorophenyl)-3-methyl-5-pyrazolone. | Cr | orange. |
| 27 | ___do___ | 1 - (3' - trifluoromethyl - phenyl) - 3 - methyl-5-pyrazolone. | Cr | Do. |

The 4-nitro-2-amino-1-hydroxybenzene-6-sulfonic acid-N-methylamide given as a diazo component in the above table can be made as follows:

305 parts of sodium 2:4-dinitro-1-chlorobenzene-6-sulfonate are introduced in small portions into the 1200 parts of chlorosulfonic acid while stirring at room temperature, and the whole is heated for 4 hours at 150–155° C. When the reaction mixture has cooled, it is poured on to 3000 parts of ice and the precipitated 2:4-dinitro-1-chlorobenzene-6-sulfonic acid chloride is separated by filtration (this product melts at 104–106° C. after recrystallization from ether). The moist paste after being washed neutral with ice water, is stirred with 200 parts of water and 300 parts of ice, and in the course of one hour 225 parts of a methylamine solution of 35 per cent. strength is introduced dropwise. The whole is then further stirred for a few hours, and finally acidified with hydrochloric acid and filtered. The filter cake consisting of 2:4-dinitro-1-chlorobenzene-6-sulfonic acid-N-methylamide is introduced into a partial solution or suspension of 185 parts of calcium hydroxide in 800 parts of water, and the whole is heated under reflux for 4 hours. When the mixture has been acidified with acid, the precipitated 2:4-dinitro-1-hydroxybenzene-6-sulfonic acid - N - methylamide is filtered off with suction. The product is dissolved at 30° C. in 200 parts of water and 50 parts of sodium hydroxide solution of 30 per cent. strength, and after the addition of a solution of 80 parts of sodium hydrosulfide in 100 parts of water the whole is stirred for one hour, the temperature rising to 60° C. After acidification with hydrochloric acid, the resulting 4-nitro-2-amino-1-hydroxybenzene-6-sulfonic acid-N-methylamide is filtered off.

By using instead of methylamine a corresponding quantity of aniline, 4-nitro-2-amino-1-hydroxybenzene-6-sulfonic acid-N-phenylamide is obtained by the method described above.

The 5-pyrazolone-3-carboxylic acid-n-butylamide given as coupling component in the above table can be made, for example, as follows:

15.6 parts of 5-pyrazolone-3-carboxylic acid ethyl ester are heated in 40 parts of n-butylamide for a long time at 75–95° C. under reflux. The excess of n-butylamine is then distilled off, the residue is dissolved in water, if required, impurities are separated by filtration, and the 5-pyrazolone-3-carboxylic acid-n-butylamide is precipitated with hydrochloric acid. The resulting 5-pyrazolone-3-carboxylic acid-n-butylamide melts sharply at 246–247° C. after recrystallization from ethyl alcohol.

The same product is obtained by suspending 5-pyrazolone-3-carboxylic acid in an inert solvent such as chlorobenzene, adding phosphorus trichloride to the resulting suspension, and simultaneously or subsequently reacting with n-butylamine.

*Example 4*

21.8 parts of the dyestuff from diazotized 2-amino-1-hydroxybenzene-4-sulfonic acid methylamide and 1-(4'-chlorophenyl)-3-methyl-5-pyrazolone and 20.7 parts of the dyestuff from diazotized 2-amino-1-hydroxybenzene-4-sulfonic acid methylamide and 1-acetylamino-7-hydroxynaphthalene, both dyestuffs being in the form of a moist paste (filter cake), are dissolved in 800 parts of water with the addition of 4.0 parts of sodium hydroxide. After the addition of 125 parts of a solution of sodium chromosalicylate having a chromium content of 2.6 per cent. the whole is boiled under reflux for 4–5 hours. At the end of this period the formation of the mixed complex is complete. The dyestuff may then be precipitated by the addition of sodium chloride and neutralized with acetic acid or it may be obtained by complete evaporation. When dry, it is a black powder which dissolves in water with a brown coloration and in concentrated sulfuric acid with a brown-red coloration, and dyes wool from a neutral or weakly acetic acid bath violettish brown tints having good properties of fastness.

The corresponding cobalt complex can be made as follows:

21.8 parts of the dyestuff from diazotized 2-amino-1-hydroxybenzene-4-sulfonic acid methyl amide and 1-(4'-chloro-phenyl)-3-methyl-5-pyrazolone and 20.7 parts of the dyestuff from diazotized 2-amino-1-hydroxybenzene-4-sulfonic acid methylamide and 1-acetylamino-7-hydroxynaphthalene, the two dyestuffs being in the form of a moist paste (filter cake), are dissolved in 800 parts of water with the addition of 8.0 parts of sodium hydroxide. The whole is then heated to 80° C. and mixed with 110 parts of a cobalt sulfate solution having a cobalt content of 2.95 per cent. After heating for a short time at 85° C. the formation of the complex is complete. By neutralization with dilute acetic acid and the addition of sodium chloride the dyestuff is precipitated. When dry it is a dark brown powder which dissolves in water with a yellow-brown coloration and in concentrated sulfuric acid with a red-brown coloration, and dyes wool either from a neutral or acetic acid bath full brown tints of good properties of fastness. The dyestuff is also suitable for dyeing Nylon (super-polyamide fibers).

By using in this example 23.5 parts of the dyestuff from diazotized 2-amino-1-hydroxybenzene-4-sulfonic acid methylamide and 1-n-butyrylamino-7-hydroxynaphthalene, instead of 20.7 parts of the dyestuff from diazotized 2-amino-1-hydroxybenzene-4-sulfonic acid methylamide and 1-acetylamino-7-hydroxynaphthalene, there are obtained a chromium complex and a cobalt complex which also dyes wool violettish brown and brown tints, respectively.

In the following table are given further complex metal compounds which are made by the method described in this example. In columns I and II are given the monoazo-dyestuffs used as starting materials and in column III the metals. In column IV the tints of the dyeings obtainable on wool with the corresponding metal complexes from neutral to acetic acid baths are given.

| | I | II | III | IV |
|---|---|---|---|---|
| 1 | 2-amino-1-hydroxy-benzene-4-sulfonic acid-methylanilide → 1-phenyl-3-methyl-5-pyrazolone. | 2-amino-1-hydroxy-benzene-4-sulfonic acid-methylamide → 1-phenyl-3-methyl-5-pyrazolone. | Cr | orange. |
| 2 | do | do | Co | brown yellow. |
| 3 | 2-amino-1-hydroxy-benzene-4-sulfonic acid-cyclohexylamide → 1-phenyl-3-methyl-5-pyrazolone. | do | Cr | orange. |
| 4 | 2-amino-1-hydroxy-benzene-4-sulfonic acid benzylamide → 1-phenyl-3-methyl-5-pyrazolone. | do | Cr | Do. |
| 5 | 2-amino-1-hydroxy-benzene-4-sulfonic acid-methylamide → 1-(4'-chlorophenyl)-3-methyl-5-pyrazolone. | 6-acetylamino-4-nitro-2-amino-1-hydroxybenzene → 1-acetylamino-7-hydroxynaphthalene. | Cr | brown. |
| 6 | do | do | Co | Do. |
| 7 | do | 2-amino-1-hydroxy-benzene-4-sulfonic acid methylamide → 2-hydroxynaphthalene. | Cr | violettish brown. |
| 8 | do | do | Co | red-brown. |
| 9 | do | 2-amino-1-hydroxy-benzene-4-sulfonic acid amide → 5:8-dichloro-1-hydroxy-naphthalene. | Cr | violet brown. |
| 10 | do | do | Co | reddish brown. |
| 11 | 2-amino-1-hydroxy-benzene-4-sulfonic acid-methylamide → 1-phenyl-3-methyl-5-pyrazolone. | 2-amino-1-hydroxy-benzene-4-sulfonic acid pyrrolidide → 1-phenyl-3-methyl-5-pyrazolone. | Cr | orange. |
| 12 | do | do | Co | brownish yellow. |

Example 5

100 parts of well wetted wool are entered at 40–50° C. into a dyebath which contains in 4000 parts of water 1 part of the chromiferous dyestuff obtainable as described in the first two paragraphs of Example 2 and 10 parts of crystalline sodium sulfate. 2 parts of acetic acid of 40 per cent. strength are added, the bath is brought to the boil in the course of ½ hour and dyeing is carried on at the boil for ¾ hour. Finally the wool is rinsed with cold water and dried. There is obtained a deep orange dyeing having good properties of wet fastness and a good fastness to light.

The same results are obtained when no acetic acid is added to the dyebath.

By the use of 100 parts of superpolyamide fibers (nylon fibers) instead of 100 parts of wool there is likewise obtained an orange dyeing having good properties of wet fastness and fastness to light.

What is claimed is:

1. A complex metal compound of monoazo dyestuffs free from sulfonic acid and carboxylic acid groups, which contains two monoazo dyestuffs so bound in complex union with a metal selected from the group consisting of chromium and cobalt that the ratio of the number of metal atoms bound in complex union to the number of monoazo dyestuff molecules is smaller than 1:1 and substantially about 1:2, and in which one of the monoazo dyestuffs present corresponds to the formula

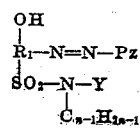

in which $R_1$ represents a benzene radical bound to the azo group in a position vicinal to the hydroxy group, Pz represents a 5-pyrazolone radical bound to the azo group in 4-position, $n$ represents an integer which is at most 6, and Y represents a member selected from the group consisting of alkyl, aralkyl and aryl radicals, and the other monoazo dyestuff present in the complex compound is a monoazo dyestuff selected from the group consisting of a monoazo dyestuff corresponding to that same formula and a monoazo dyestuff which corresponds to the formula $$\text{OH} \atop R_2-N=N-R_3$$

in which $R_2$ represents a benzene radical bound to the azo linkage in ortho position relatively to the hydroxyl group, and $R_3$ represents a hydroxynaphthalene radical bound to the azo linkage in a position vicinal to its hydroxyl group.

2. A complex chromium compound of monoazo dyestuffs free from sulfonic acid and carboxylic acid groups, which contains two monoazo dyestuffs so bound in complex union that the ratio of the number of chromium atoms bound in complex union to the number of monoazo dyestuff molecules is smaller than 1:1 and substantially about 1:2, and in which both monoazo dyestuffs correspond to the formula

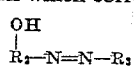

in which $R_1$ represents a benzene radical bound to the azo group in a position vicinal to the hydroxy group, Pz represents a 5-pyrazolone radical bound to the azo linkage in 4-position, and $n$ represents a whole number up to 6.

3. A complex cobalt compound of monoazo dyestuffs free from sulfonic acid and carboxylic acid groups, which contains two monoazo dyestuffs so bound in complex union that the ratio of the number of cobalt atoms bound in complex union to the number of monoazo dyestuff molecules is smaller than 1:1 and substantially about 1:2, and in which both monoazo dyestuffs correspond to the formula $$R_1-N=N-Pz$$
with OH (on $R_1$) and $SO_2-NH-C_nH_{2n+1}$ in which $R_1$ represents a benzene radical bound to the azo group in a position vicinal to the hydroxy group, Pz represents a 5-pyrazolone radical bound to the azo linkage in 4-position and $n$ represents a whole number up to 6.

4. A complex chromium compound of monoazo dyestuffs free from sulfonic acid and carboxylic acid groups, which contains two monoazo dyestuffs so bound in complex union that the ratio of the number of chromium atoms bound in complex union to the number of monoazo dyestuff molecules is smaller than 1:1 and substantially about 1:2, and in which one of the monoazodyestuffs present corresponds to the formula $$R_1-N=N-Pz$$
with OH and $SO_2-NH-C_nH_{2n+1}$ in which $R_1$ represents a benzene radical bound to the azo group in a position vicinal to the hydroxy group, Pz represents a 5-pyrazolone radical bound to the azo linkage in 4-position and $n$ represents a whole number up to 6, the other monoazo dyestuff present in the complex corresponding to the formula $$R_2-N=N-R_3$$
with OH in which $R_2$ represents a benzene radical bound to the azo linkage in ortho position to the hydroxyl group and containing a sulfonic acid amide group, and $R_3$ represents a 2-hydroxy-naphthalene radical bound to the azo group in 1-position.

5. A complex cobalt compound of monoazo dyestuffs free from sulfonic acid and carboxylic acid groups, which contains two monoazo dyestuffs so bound in complex union that the ratio of the number of cobalt atoms bound in complex union to the number of monoazo dyestuff molecules is smaller than 1:1 and substantially about 1:2, and in which one of the monoazo dyestuffs present corresponds to the formula $$R_1-N=N-Pz$$
with OH and $SO_2-NH-C_nH_{2n+1}$ in which $R_1$ represents a benzene radical bound to the azo group in a position vicinal to the hydroxy group, Pz represents a 5-pyrazolone radical bound to the azo linkage in 4-position and $n$ represents a whole number up to 6, the other monoazo dyestuff present in the complex corresponding to the formula $$R_2-N=N-R_3$$
with OH in which $R_2$ represents a benzene radical bound to the azo linkage in ortho position to the hydroxyl group and containing a sulfonic acid amide group, and $R_3$ represents a 2-hydroxynaphthalene radical bound to the azo group in 1-position.

6. A complex chromium compound containing one atom of chromium in complex union with substantially two molecules of monoazo dyestuffs free from sulfonic acid and carboxylic acid groups, and of which one corresponds to the formula $$R_1-N=N-Pz$$
with OH and $SO_2-NH-C_nH_{2n+1}$ in which $R_1$ represents a benzene radical bound to the azo group in a position vicinal to the hydroxyl group, Pz represents a 3-methyl-5-pyrazolone radical bound to the azo group in 4-position and $n$ represents a whole number up to 6, the other monoazo dyestuff corresponding to the formula $$R_2-N=N-\text{(naphthalene with HO, HN-COCH}_3\text{)}$$
with $SO_2NH-C_{n-1}H_{2n-1}$ in which $R_2$ represents a benzene radical bound to the azo group in ortho position to the hydroxyl group and $n$ is an integer which is at most 7.

7. A complex cobalt compound containing one atom of cobalt in complex union with substantially two molecules of monoazo dyestuffs free from sulfonic acid and carboxylic acid groups, and of which one corresponds to the formula $$R_1-N=N-Pz$$
with OH and $SO_2-NH-C_nH_{2n+1}$ in which $R_1$ represents a benzene radical bound to the azo group in a position vicinal to the hydroxyl group, Pz represents a 3-methyl-5-pyrazolone radical bound to the azo group in 4-position and $n$ represents a whole number up to 6, the other monoazo dyestuff corresponding to the formula $$R_2-N=N-\text{(naphthalene with HO, HN-COCH}_3\text{)}$$
with $SO_2NH-C_{n-1}H_{2n-1}$ in which $R_2$ represents a benzene radical bound to the azo group in ortho position to the hydroxyl group and $n$ is an integer which is at most 7.

8. A complex cobalt compound containing one atom of cobalt in complex union with substantially two molecules of monoazo dyestuffs free from sulfonic acid and carboxylic acid groups, both of which correspond to the formula $$R_1-N=N-Pz$$
with OH and $SO_2-NH-C_nH_{2n+1}$ in which $R_1$ represents a benzene radical bound to the azo group in a position vicinal to the hydroxyl group, Pz represents a 3-methyl-5-pyrazolone radical bound to the azo group in 4-position, and $n$ represents a whole number up to 6.

9. A complex chromium compound containing one atom of chromium in complex union with substantially two molecules of monoazo dyestuffs free from sulfonic acid and carboxylic acid groups, both of which correspond to the formula $$R_1-N=N-Pz$$
with OH and $SO_2-NH-C_nH_{2n+1}$ in which $R_1$ represents a benzene radical bound to the azo group in a position vicinal to the hydroxyl group, Pz represents a 3-methyl-5-pyrazolone radical bound to the azo group in 4-position, and $n$ represents a whole number up to 6.

10. A complex chromium compound containing one atom of chromium in complex union with substantially two molecules of monoazo dyestuffs free from sulfonic acid and carboxylic acid groups, both of which correspond to the formula

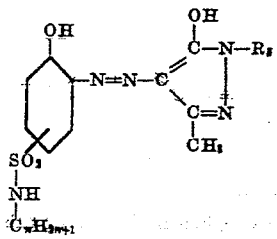

in which $R_5$ represents a benzene radical, and $n$ represents a whole number up to 6.

11. A complex cobalt compound containing one atom of cobalt in complex union with substantially two molecules of monoazo dyestuffs free from sulfonic acid and carboxylic acid groups, both of which correspond to the formula

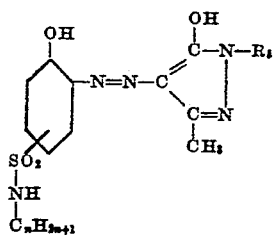

in which $R_5$ represents a benzene radical, and $n$ represents a whole number up to 6.

12. A complex chromium compound containing one atom of chromium in complex union with substantially two molecules of monoazo dyestuffs free from sulfonic acid and carboxylic acid groups, both of which correspond to the formula

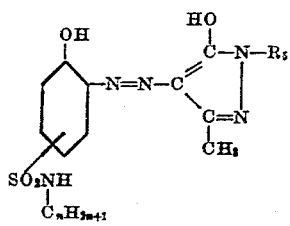

in which $R_5$ represents a member selected from the group consisting of a chlorinated and a fluorinated benzene radical and $n$ represents an integer which is at most 6.

13. A complex cobalt compound containing one atom of cobalt in complex union with substantially two molecules of monoazo dyestuffs free from sulfonic acid and carboxylic acid groups, both of which correspond to the formula

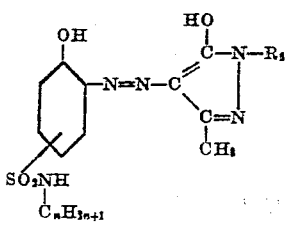

in which $R_5$ represents a chlorinated benzene radical and $n$ represents an integer which is at most 6.

14. A complex chromium compound containing one atom of chromium in complex union with substantially two molecules of monoazo dyestuffs free from sulfonic acid and carboxylic acid groups, and of which one corresponds to the formula

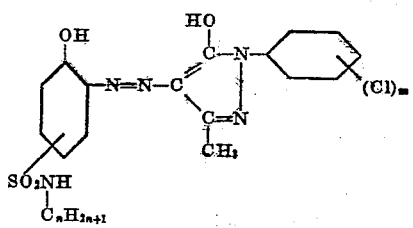

in which $m$ represents an integer which is at most 3 and $n$ an integer which is at most 6, and the other monoazo dyestuff present in the complex corresponds to the formula

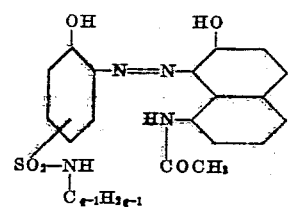

in which $q$ represents an integer which is at most 7.

15. A complex cobalt compound containing one atom of cobalt in complex union with substantially two molecules of monoazo dyestuffs free from sulfonic acid and carboxylic acid groups, and of which one corresponds to the formula

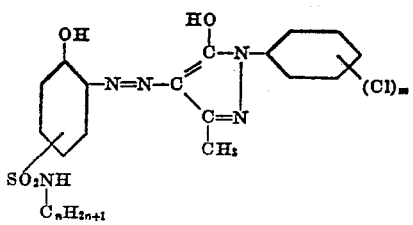

in which $m$ represents an integer which is at most 3 and $n$ an integer which is at most 6, and the other monoazo dyestuff present in the complex corresponds to the formula

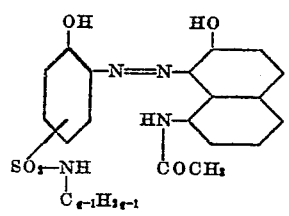

in which $q$ represents an integer which is at most 7.

16. The complex chromium compound containing one atom of chromium in complex combination with substantially two molecules of monoazo dyestuffs of which one corresponds to the formula

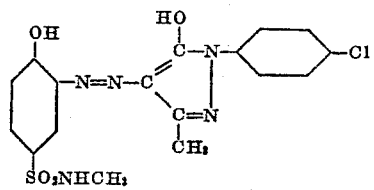

and the other to the formula

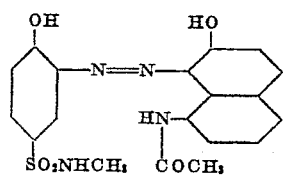

17. The complex cobalt compound containing one atom of cobalt in complex combination with substantially two molecules of monoazo dyestuffs of which one corresponds to the formula

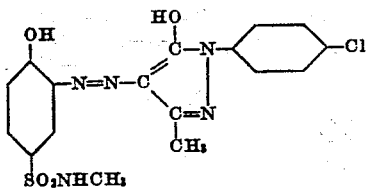

and the other to the formula

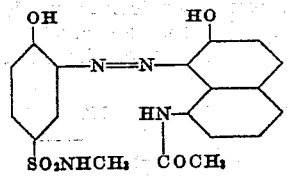

18. The complex chromium compound containing one atom of chromium in complex combination with substantially two molecules of the monoazo dyestuff corresponding to the formula

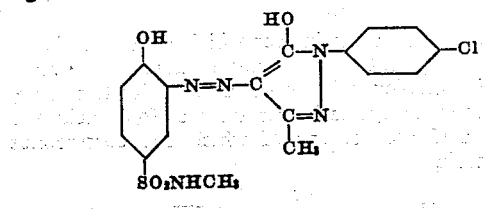

19. The complex cobalt compound containing one atom of cobalt in complex combination with substantially two molecules of the monoazo dyestuff corresponding to the formula

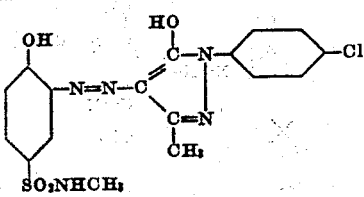

References Cited in the file of this patent

UNITED STATES PATENTS

| | | |
|---|---|---|
| 1,918,938 | Straub et al. | July 18, 1933 |
| 2,012,779 | Straub et al. | Aug. 27, 1935 |
| 2,559,331 | Widmer et al. | July 3, 1951 |
| 2,572,394 | Ruckstuhl et al. | Oct. 23, 1951 |
| 2,610,175 | Widmer et al. | Sept. 9, 1952 |
| 2,623,871 | Schetty et al. | Dec. 30, 1952 |